US011720796B2

(12) United States Patent
Uria-Martínez et al.

(10) Patent No.: US 11,720,796 B2
(45) Date of Patent: Aug. 8, 2023

(54) NEURAL EPISODIC CONTROL

(71) Applicant: DeepMind Technologies Limited, London (GB)

(72) Inventors: Benigno Uria-Martínez, London (GB); Alexander Pritzel, London (GB); Charles Blundell, London (GB); Adrià Puigdomènech Badia, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/856,527

(22) Filed: Apr. 23, 2020

(65) Prior Publication Data

US 2020/0265317 A1 Aug. 20, 2020

Related U.S. Application Data

(63) Continuation of application No. 16/445,523, filed on Jun. 19, 2019, now Pat. No. 10,664,753, which is a
(Continued)

(51) Int. Cl.
*G06N 3/084* (2023.01)
*G06N 3/006* (2023.01)
(Continued)

(52) U.S. Cl.
CPC ............. *G06N 3/084* (2013.01); *G06N 3/006* (2013.01); *G06N 3/08* (2013.01); *G06N 3/04* (2013.01); *G06N 3/044* (2023.01)

(58) Field of Classification Search
CPC .......... G06N 3/084; G06N 3/006; G06N 3/08; G06N 3/04; G06N 3/0445
See application file for complete search history.

(56) References Cited

U.S. PATENT DOCUMENTS

| 2014/0237163 A1* | 8/2014 | Maharana | G06F 12/0871 711/103 |
| 2015/0100530 A1* | 4/2015 | Mnih | A63F 13/67 706/25 |
| 2018/0165603 A1* | 6/2018 | Van Seijen | G06N 3/084 |

FOREIGN PATENT DOCUMENTS

CN 106056213 10/2016

OTHER PUBLICATIONS

Paul J. Werbos, "Backpropagation Through Time: What it Does and How to Do It," IEEE (1990) (Year: 1990).*
(Continued)

*Primary Examiner* — Ying Yu Chen
*Assistant Examiner* — Kevin L. Smith
(74) *Attorney, Agent, or Firm* — Fish & Richardson P.C.

(57) ABSTRACT

A method includes maintaining respective episodic memory data for each of multiple actions; receiving a current observation characterizing a current state of an environment being interacted with by an agent; processing the current observation using an embedding neural network in accordance with current values of parameters of the embedding neural network to generate a current key embedding for the current observation; for each action of the plurality of actions: determining the p nearest key embeddings in the episodic memory data for the action to the current key embedding according to a distance measure, and determining a Q value for the action from the return estimates mapped to by the p nearest key embeddings in the episodic memory data for the action; and selecting, using the Q values for the actions, an action from the multiple actions as the action to be performed by the agent.

20 Claims, 4 Drawing Sheets

Related U.S. Application Data continuation of application No. PCT/EP2018/054624, filed on Feb. 26, 2018.

(60) Provisional application No. 62/463,558, filed on Feb. 24, 2017.

(51) Int. Cl.
*G06N 3/08* (2023.01)
*G06N 3/04* (2023.01)
*G06N 3/044* (2023.01)

(56) References Cited

OTHER PUBLICATIONS

Oh et al., "Control of Memory, Active Perception, and Action in Minecraft," International Conference on Machine Learning (2016) (Year: 2016).*
Scott Ellison Reed, Deep Neural Networks for Visual Reasoning, Program Induction, and Text-to-Image Synthesis (Thesis) (Year: 2016).*
Wimmer et al, "Episodic Memory Encoding Interferes with Reward Learning and Decreases Striatal Prediction Errors," Journal of Neuroscience (2014) (Year: 2014).*
Kaiser et al., "Learning to Remember Rare Events," ICLR (Dec. 12, 2016) (Year: 2016).*
JP Notice of Allowance in Japanese Appln. No. 2019-546227, dated Nov. 24, 2020, 5 pages (with English translation).
Ba, "Using fast weights to attend to the recent past" arXiv, Dec. 2016, 10 pages.
Bakker et al, "A robot that reinforcement-learns to identify and memorize important previous observations", IEEE Xplore, 2003.
Bellemare et al, "The acrade learning environment: An evaluation platform for general agents" arXiv, Jun. 2013, 27 pages.
Bentley et al, "Multidimensional binary search trees used for associative searching" Commun. ACM, Sep. 1975, 9 pages.
Blundell et al, "Model-free episodic control," arXiv, Jun. 14, 2016, 12 pages.
Chandar et al, "Hierarchical memory networks," arXiv, May 24, 2016, 10 pages.
Duan et al, "$RL_2$:Fast reinforcement learning via slow reinforcement learning" arXiv, Nov. 2016, 14 pages.
Fernando et al, "Pathnet: Evolution channels gradient descent in super neural networks" arXiv, Jan. 2017, 16 pages.
Gabel et al, "Cbr for state value function approximation in reinforcement learning," Springer, 2005, 15 pages.
Graves et al, "Hybrid computing using a neural network with dynamic external memory" Nature, 2016, 21 pages.
Harutyunyan et al, "Q (\ lambda) with off-policy corrections" arXiv, Aug. 2016, 15 pages.
Hausknecht et al, "Deep recurrent q-learning for partially observable mdps" arXiv, Aug. 2015, 9 pages.
He et al, "Learning to play in a day: Faster deep reinforcement learning by optimality tightening" arXiv, Nov. 2016, 13 pages.
Hinton et al, "Using fast weights to deblur old memories", Proceedings of the ninth annual conference of the Cognitive Science Society, 1987, 12 pages.
Ho et al., "Reinforcement Learning using a Recurrent Neural Network," (IEEE 1994) (Year: 1994).
Hochreiter et al, "Long short-term memory," nature comput, Nov. 1997, 46 pages.
Kaiser et al, "Learning to remember rare events," ICLR, Dec. 12, 2016, 12 pages.
Kingma et al, "Auto-encoding variational bayes" arXiv, Dec. 2013, 14 pages.
Kumaran et al, "What learning systems do intelligent agents need? Complementary learning systems theory updated" Trends in Cognitive Science, Jul. 2016, 3 pages.
Lake et al, "Building machines that learn and think like people" arXiv, Nov. 2016, 58 pages.
Lengyel et al, "Hippocampal contributions to control: The third way" NIPS, 2007, 8 pages.
McCloskey et al, "Catastrophic interference in connectionist networks: The sequential learning problem" in Psychology of Learning and Motivation vol. 24, 1989.
Miller et al, "Key-value memory networks for directly reading documents" arXiv, Oct. 2016, 10 pages.
Mnih et al, "Asynchronous methods for deep reinforcement learning" arXiv, Jun. 2016, 19 pages.
Mnih et al, "Human-level control through deep reinforcement learning" Nature, 2015, 13 pages.
Munos et al, "Barycentric interpolators for continuous space and time reinforcement learning" NIPS, 1998, 7 pages.
Munos et al, "Safe and efficient off-policy reinforcement learning" arXiv, Nov. 2016, 18 pages.
Oh et al, "Action-conditional video prediction using deep networks in atari games" arXiv, Dec. 2015, 26 pages.
Oh et al, "Control of memory, active perception, and action in minecraft" arXiv, May 2016, 22 pages.
Osband et al., "Deep exploration via bootstrapped dqn" arXiv, Jul. 2016, 18 pages.
PCT International Preliminary Report on Patentability in International Appln. No. PCT/EP2018/054624, dated Aug. 27, 2019, 8 pages.
PCT International Search Report and Written Opinion in International Appln. PCT/EP2018/054624, dated Jun. 5, 2018, 14 pages.
Peng et al, "Incremental multi-step q-learning" Machine Learning, 1996, 8 pages.
Rae et al, "Scaling memory-augmented neural networks with sparse reads and write," arXiv, Oct. 27, 2016.
Rezende et al, "Stochastic backpropagation and approximate inference in deep generative models" arXiv, May 2014, 14 pages.
Rusu et al, "Progressive neural networks" arXiv, Sep. 2016, 14 pages.
Santamaria et al, "Experiments with reinforcement learning in problems with continuous state and action spaces" Adaptive Behavior, 1997, 48 pages.
Santoro et al, "One-shot learning with memory-augmented neural networks," arXiv, May 19, 2016, 13 pages.
Schaul et al, "Prioritized experience replay" part a, arXiv, Nov. 2015, 23 pages.
Schaul et al, "Prioritized experience replay", part b, arXiv, Nov. 2015, 23 pages.
Silver et al, "Mastering the game of go with deep neural networks and tree search," Nature, 2016, 20 pages.
Sukhbaatar et al, "End-to-end memory networks" arXiv, Nov. 2015, 11 pages.
Sutton et al, "Learning to predict by the methods of temporal differences" Machine learning, 1988, 37 pages.
Sutton et al, "Reinforcement learning: An introduction", MIT Press, 1998, 352 pages.
Van Hasselt et al, "Deep reinforcement learning with double q-learning" AAAI, 2016, 7 pages.
Van Hasselt et al, "Learning functions across many orders of magnitudes" arXuv, Feb. 2016, 17 pages.
Vezhenevets et al, "Strategic attentive writer for learning macro-actions", arXiv, Jun. 2016, 10 pages.
Vinyals et al, "Matching networks for one shot learning," arXiv, Jun. 13, 2016, 12 pages.
Wang et al, "Learning to reinforcement learn", arXiv, Nov. 2016, 17 pages.
Watkins et al, "Learning from delayed rewards" University of Cambridge, May 1989, 241 pages.
Watkins et al, "Q-learning", Machine Learning, 1992, 14 pages.
Extended European Search Report in European Appln. No. 22170944.7, dated Jul. 28, 2022, 12 pages.
Office Action in Chinese Appln. No. 201880008758.6, dated Sep. 2, 2022, 16 pages (with English translation).
Decision to Grant a Patent in Japanese Appln. No. 2020213556, dated Feb. 7, 2022, 5 pages (with English translation).

* cited by examiner

NEURAL EPISODIC CONTROL

CROSS-REFERENCE TO RELATED APPLICATION

This patent application is a continuation (and claims the benefit of priority under 35 USC 120) of U.S. patent application Ser. No. 16/445,523, filed Jun. 19, 2019, which claims the benefit of International Application No. PCT/EP2018/054624, filed on Feb. 26, 2018, which claims priority to U.S. Provisional Application Ser. No. 62/463,558, filed on Feb. 24, 2017. The disclosure of the prior applications is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can select an action to be performed by an agent interacting with an environment from a set of actions using episodic memory data maintained by the system.

In general, one innovative aspect of the subject matter described in this specification can be embodied in a computer-implemented method that includes maintaining, by one or more computers, respective episodic memory data for each action of a plurality of actions. The episodic memory data for each action maps each of a respective plurality of key embeddings to a respective return estimate. The method includes receiving, by the one or more computers, a current observation characterizing a current state of an environment being interacted with by an agent. The method includes processing, by the one or more computers, the current observation using an embedding neural network in accordance with current values of parameters of the embedding neural network to generate a current key embedding for the current observation. For each action of the plurality of actions, the method includes determining, by one or more computers, the p nearest key embeddings in the episodic memory data for the action to the current key embedding according to a distance measure, and determining, by one or more computers, a Q value for the action from the return estimates mapped to by the p nearest key embeddings in the episodic memory data for the action. The Q value for the action is a predicted return that would result from the agent performing the action in response to the current observation. The method further includes selecting, by the one or more computers and using the Q values for the actions, an action from the plurality of actions as the action to be performed by the agent in response to the current observation.

The foregoing and other embodiment can each optionally include one or more of the following features, alone or in combination.

Selecting the action to be performed may include: selecting the action having a highest Q value as the action to be performed. Selecting the action to be performed may include: selecting the action having a highest Q value as the action to be performed with probability c and selecting a random action from the predetermined set of actions with probability 1−ε.

Determining a Q value for the action from the return estimates mapped to by the p nearest key embeddings in the episodic memory data for the action may include: determining a respective weight for each of the p nearest key embeddings in the episodic memory data for the action from distances between the p nearest key embeddings and the current key embedding according to the distance measure; and for each of the p nearest key embeddings in the episodic memory data for the action, weighting the estimated return mapped to the key embedding by the weight for the key embedding to determine a respective weighted estimated return.

Determining the Q value for the action may include: summing the weighted estimated returns for the action; and using the summed weighted estimated return as the Q value.

Determining the Q value for the action may include: summing the weighted estimated returns for the action; and processing a network input that comprises the summed weighted estimated return through a return neural network in accordance with current values of parameters of the return neural network to generate the Q value.

Determining the Q value for the action may include: processing a network input that comprises the weighted estimated returns through a return neural network in accordance with current values of parameters of the return neural network to generate the Q value.

The network input may include the current observation. The embedding neural network may be a convolutional neural network. The embedding neural network may include one or more recurrent neural network layers.

The method may further include determining a current return resulting from the agent performing the selected action in response to the current observation. This current return is referred to later as a current bootstrapped return because it is used to determine a Q-value which depends on the data stored in the episodic memory, and this Q-value is itself used to update the data stored in the episodic memory in particular the key embeddings and corresponding return estimates.

The method may include determining whether the current key embedding matches any of the key embeddings in the episodic memory data for the action. When the current key embedding does not match any of the key embeddings in the episodic memory data for the action: the method may include adding data mapping the current key embedding to the current (bootstrapped) return to the episodic memory data for the action. When the current key embedding matches a key embedding in the episodic memory data for the action, the method may include updating the episodic memory data to map the matching key embedding to a weighted average of the current (bootstrapped) return and the return estimate currently mapped to by the matching key embedding.

The method may further include: generating a new tuple that includes the current observation, the selected action, and the current (bootstrapped) return; and adding the new tuple to a replay memory. The method may further include: sampling a training tuple from the replay memory, the training tuple comprising a training observation, a training selected action, and a training return; determining a Q value for the training selected action from the training observation using the respective method described above; and back-propagating a gradient of an error between the Q value for the training selected action and the training return to update the key embeddings, the estimated returns, and the current values of the parameters of the embedding neural network. Similarly to the current return, the training return is referred to later as a training bootstrapped return.

The subject matter described in this specification can be implemented in particular embodiments so as to realize one or more of the following advantages. By incorporating a memory, i.e., the episodic memory data (which includes a respective episodic memory module for each of the actions), that is used as described in this specification, the system can perform better on a variety of reinforcement learning tasks. That is because the episodic memory architecture described in this specification can rapidly integrate recent experience—state representations and corresponding return value estimates, and therefore the memory is appropriately described as episodic. The episodic memory allows this information to be rapidly integrated into future behaviors of reinforcement learning agents and improving future behaviors. Thus in some implementations, the system can learn tasks from an order of magnitude fewer interactions with an environment than previous systems. The episodic memory architecture can further allow for smaller neural networks, i.e., the system can have a smaller number of network parameters while still achieving comparable or better performance. Additionally, the components of the system are entirely differentiable and, because of the manner in which the episodic memory is written to and read from, the components can be trained in less time, reducing how many computing resources, e.g., how much memory and how much processing power, are necessary for the system to reach a high level of performance on a given reinforcement learning task.

In particular, the episodic memory described in this specification maps key embeddings to Q values and uses a context-based lookup on the key embeddings to retrieve useful Q values during the action selection process. Generally, for a given action the key embeddings are embeddings in the episodic memory data of observations in response to which a given action was performed by the agent. By having a slow-changing, stable representation provided by an embedding neural network, the key embeddings stored in the episodic memory remain relative stable and therefore allows for stable training. In contrast to other neural memory architectures for reinforcement learning, the Q values retrieved from the episodic memory can be updated much faster, which helps alleviate the typically slow weight updates of stochastic gradient descent applied to the whole network. For example a lower learning rate can be used for updating the embedding neural network than for updating key embedding-return estimate pairs stored in the differentiable episodic memory during training. In some implementations the system estimates Q values using N-step Q value function that interpolates between Monte Carlo value estimates and backed up off-policy estimates, which provide a trade-off between speed of reward propagation and optimality. More generally a return estimate may comprise an estimate of a value function associated with a state of the environment as represented by a key embedding. During training, in each time step of a training episode such a key-value pair may be inserted into the episodic memory.

Further, unlike other memory architectures such as LSTM, the episodic memory described herein does not try to learn when to write to memory, as this can be slow to learn and take a significant amount of time. Instead, the system elects to write all experiences to the episodic memory (until the memory's maximum capacity is reached), and allows the memory to grow very large compared to existing memory architectures. The system can efficiently read from this large memory by using a fast approximate nearest neighbor algorithm, e.g., kd-tree based nearest neighbor algorithm. The data stored in the episodic memory may persist across multiple training episodes, where a training episode may comprise training until the end or completion of a task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment from a set of actions using a neural episodic controller.

In order to interact with the environment, the agent receives data characterizing the current state of the environment and performs an action from an action space in response to the received data. Data characterizing a state of the environment will be referred in this specification as an observation.

In some implementations, the environment is a simulated environment and the agent is implemented as one or more computers interacting with the simulated environment. For example, the simulated environment may be a video game and the agent may be a simulated user playing the video game.

In some other implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these cases, the observation can be data captured by one or more sensors of the mechanical agent as it interacts with the environment, e.g., a camera, a lidar sensor, a temperature sensor, and so on.

In some other implementations, the environment is a real-world environment and the agent manages operation of a facility (e.g., a data center). In these implementations, the actions may be actions that result in changes to various settings in the operation of the facility (e.g., turning certain components on/off and adjusting settings of various components).

In some other implementations, the environment is a real-world environment and the agent manages distribution of tasks across computing resources (e.g., on a mobile device or in a data center). In these implementations, the actions may be assigning tasks to particular computing resources.

Figure 1:
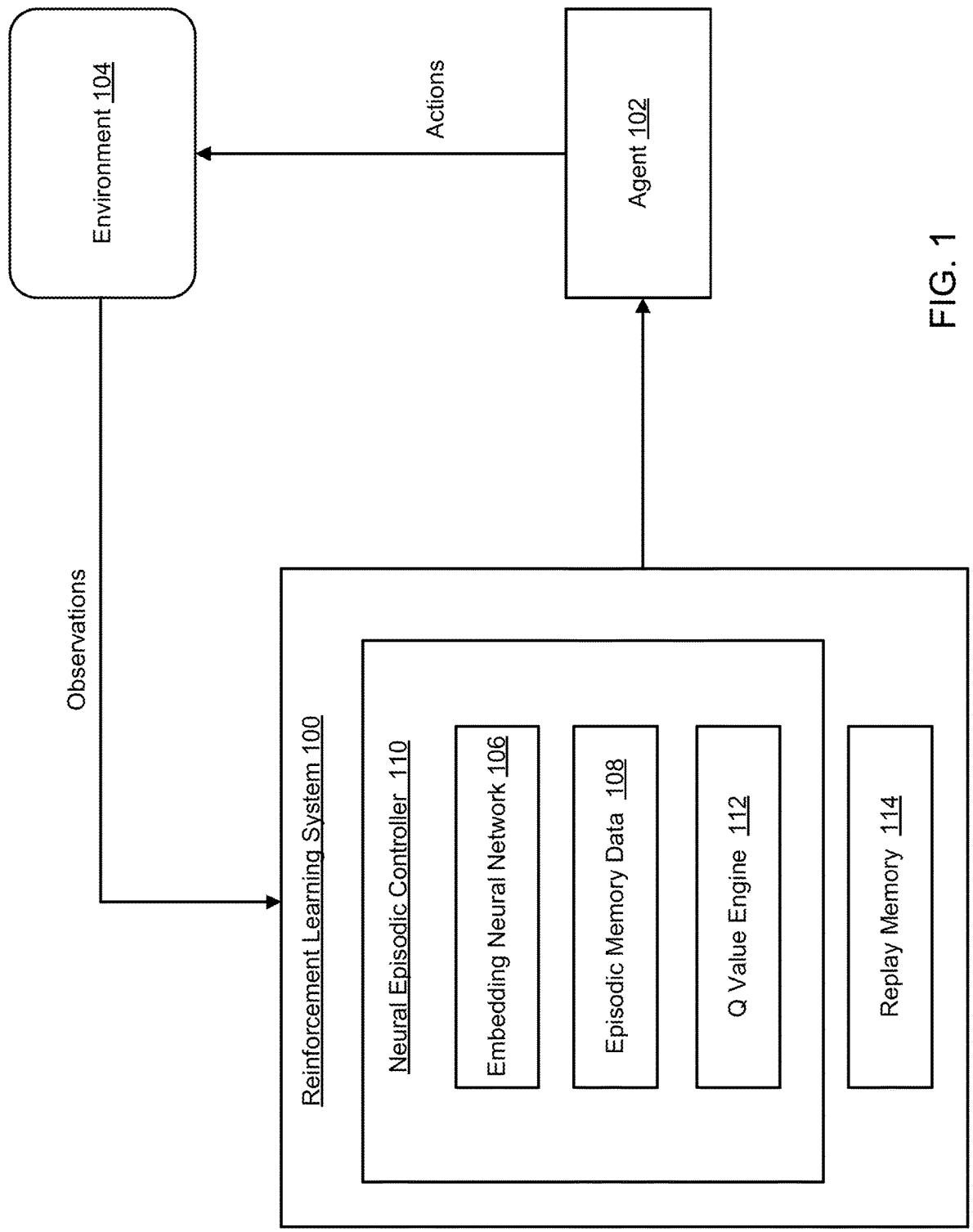
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from an action space to be performed by the reinforcement learning agent 102 in response to the observation. After the agent 102 performs a selected action, the environment 104 transitions to a new state and the system 100 receives another observation characterizing the next state of the environment 104 and a reward. The reward can be a numeric value that is received by the system 100 or the agent 102 from the environment 104 as a result of the agent 102 performing the selected action.

The reinforcement learning system 100 selects an action to be performed by the agent 102 in response to an observation using a neural episodic controller 110. The neural episodic controller 110 includes an embedding neural network 106, episodic memory data 108, and Q Value Engine 112.

To train the neural episodic controller 110, the system 100 maintains a replay memory 114. The replay memory 114 stores training tuples. Each training tuple includes a training observation, a training selected action, and a training bootstrapped return. A bootstrapped return is described in more detail below with reference to FIG. 3.

The neural episodic controller 110 maintains the episodic memory data 108 that includes a respective episodic memory module for each action a in a set A of possible actions that may be performed by the agent 102 in response to an observation.

Generally, for a given action, the episodic memory module for the given action maps each of a plurality of key embeddings to a respective return estimate for the key embedding. The key embeddings in the episodic memory module for the given action are key embeddings of observations in response to which the given action was performed by the agent. The respective return estimate mapped to by the key embedding of a given observation can be an estimate of the time-discounted combination, e.g., a sum or an average, of rewards received by the system 100 or the agent 102 after the agent 102 performed the given action in response to the observation.

Specifically, for each action $a \in A$, a respective episodic memory module can be denoted as $M_a = (K_a, V_a)$, where $K_a$ and $V_a$ are arrays of vectors, each including the same number of vectors. The sizes of arrays $K_a$ and $V_a$ can dynamically change. The episodic memory module maps a key embedding $h_i$, which is the $i^{th}$ element of the array $K_a$, to a corresponding return estimate $Q_i$, which is the $i^{th}$ element of the array $V_a$. There are two operations possible on an episodic memory module: look up and write, which will be described in more detail below.

When the system 100 receives a current observation s that characterizes a current state of the environment 104 being interacted with by the agent 102, the neural episodic controller 110 processes the current observation s using the embedding neural network 106 to generate a current key embedding h for the current observation s. The current observation s is processed in accordance with current values of parameters of the embedding neural network 106. In some implementations, the embedding neural network 106 is a convolutional neural network. In some implementations, the embedding neural network 106 includes one or more recurrent neural network layers.

In some implementations, the embedding neural network 106 includes one or more convolutional neural network layers followed by one or more fully connected layers. An example architecture of such neural network is described in Mnih et al. "Human-level control through deep reinforcement learning." Nature, 518(7540):529-533, 2015.

The neural episodic controllers 110 then uses the current key embedding h to perform a look up on a respective episodic memory module for each action $a \in A$. In particular, the neural episodic controller 110 determines, for each action $a \in A$, the p nearest key embeddings in the respective episodic memory module $M_a = (K_a, V_a)$ to the current key embedding h according to a distance measure, e.g., a distance computed using a kernel function. p can be an integer greater than one, e.g., ten, twenty-five, fifty, or one hundred. In some cases, p can be fixed. In some other cases, p can be changed (e.g., for each observation, or for every few observations).

In some implementations, to make queries into very large episodic memory modules scalable, the neural episodic controller 110 can use an approximate nearest neighbour algorithm to perform the lookups, e.g., kd-tree based nearest neighbor algorithm. Kd-tree based nearest neighbor algorithm is described in Bentley, Jon Louis. "Multidimensional binary search trees used for associative searching." Commun. ACM, 18(9): 509-517, September 1975. The episodic memory module can further reduce the number of p-nearest embeddings to a small number, e.g., p=25 or p=50 to ensure the episodic memory modules can be efficiently accessed.

In some implementations, after the episodic memory module $M_a$ is looked up, the neural episodic controller 110 writes a new key embedding and its associated return estimate into the episodic memory module $M_a$. The key embedding to be written corresponds to the key embedding h that was looked up. The associated return estimate to be written is a current bootstrapped return, which can be determined based on a process described in detail below with reference to FIG. 3.

The neural episodic controller 110 writes the new key embedding and associated return estimate to the episodic memory module by appending them onto the end of the arrays $K_a$ and $V_a$ respectively. If a key embedding already exists in the episodic memory module, then its associated return estimate is updated rather than being duplicated in the episodic memory module. Updating the episodic memory module is describe in more detail below with reference to FIG. 3, After determining the p nearest key embeddings in the respective episodic memory module $M_a$ for the action a, the neural episodic controller 110 uses a Q Value Engine 112 to determine a Q value for the action. The Q value is a predicted return that would result from the agent 102 performing the action a in response to the current observation s. The Q Value Engine 112 is configured to determines the Q value for the action a from the return estimates mapped to by the p nearest key embeddings in the episodic memory module $M_a$ for the action a. Determining a Q value for an action is described in more detail below with reference to FIG. 2.

After the Q values for actions in the set of possible actions A have been determined, the neural episodic controller 110 selects, using the determined Q values, an action from the set of possible actions A as the action to be performed by the agent 102 in response to the current observation s.

In some implementations, after the agent 102 performs the selected action, the system 100 determines the current bootstrapped return resulting from the agent 102 performing the selected action in response to the current observation s. The system 100 then generates a new tuple that includes the current observation, the selected action, and the bootstrapped return. The system adds the new tuple to the replay memory 114. The process for determining a current bootstrapped return and updating the replay memory is described in more detail below with reference to FIG. 3.

The system 100 can train the embedding neural network 106 to update the values of parameters of the embedding neural network 106 using training tuples sampled from the replay memory 114. In particular, training tuples can be sampled to form mini-batches for training. The system 100 can then update the values of parameters of the embedding neural network 106 to minimize a loss between a predicted Q value for a given training action and the bootstrapped return estimate on mini-batches from the replay memory 114. Because the architecture of the neural episodic controller is entirely differentiable, the system 100 can minimize the loss by using a gradient descent method. Training the embedding neural network 106 is described in more detail below with reference to FIG. 4.

Figure 2:
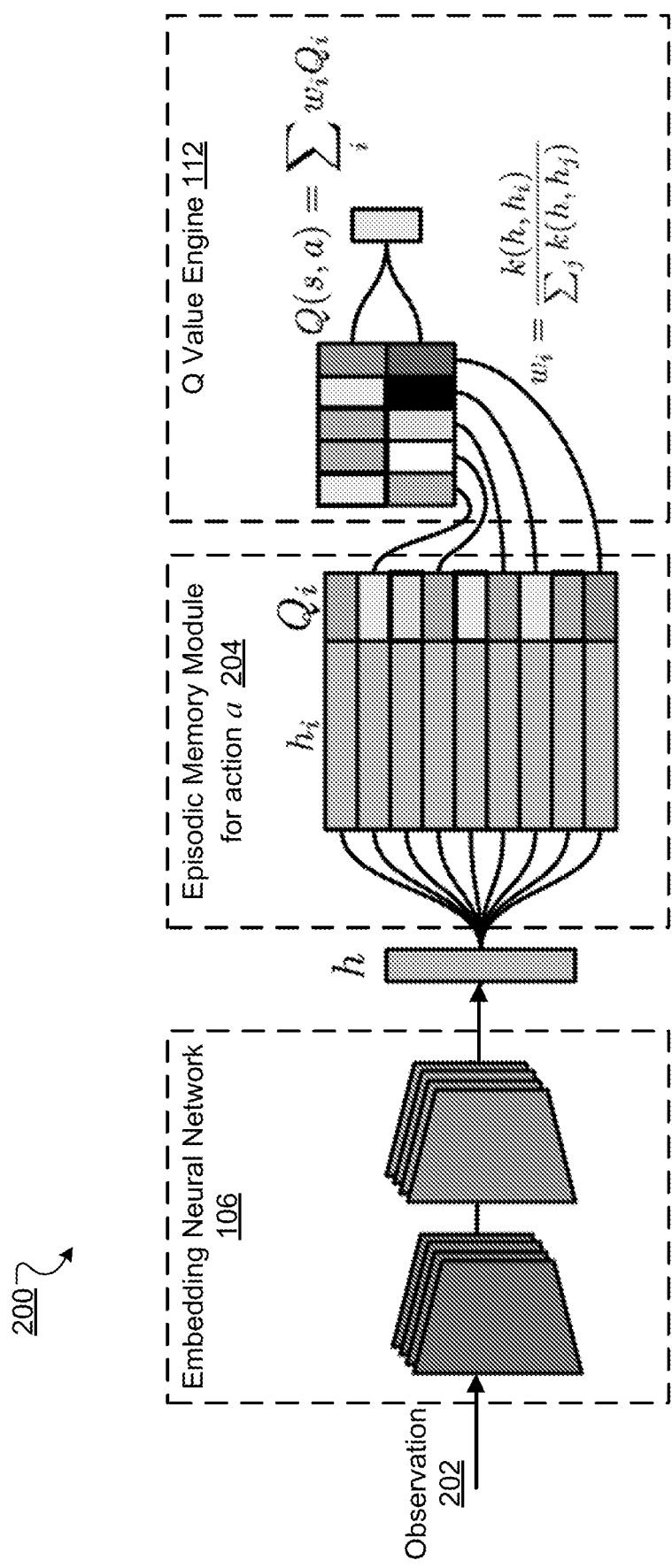
FIG. 2 is a block diagram of an example process for determining a Q value for an action.

FIG. 2 is a block diagram that shows how a neural episodic controller, e.g., the neural episodic controller 110 of FIG. 1, determines a Q value for an action.

The embedding neural network 106 of the neural episodic controller 110 receives an observation s (202) characterizing a current state of an environment. For example, the observation 202 is an image captured by a robotic agent. The embedding neural network then processes the image in accordance with current values of parameters of the embedding neural network to generate a key embedding h for the image.

For each action a∈A, the neural episodic controller 110 uses the current key embedding h to perform a look up on a respective episodic memory module 204 for the action a. The episodic memory module 204 for action a can be denoted as $M_a=(K_a, V_a)$, where $K_a$ and $V_a$ are arrays of vectors, each including the same number of vectors. The sizes of arrays $K_a$ and $V_a$ can dynamically change. The episodic memory module 204 maps a key embedding $h_i$, which is the $i^{th}$ element of the array $K_a$, to a corresponding return estimate $Q_i$, which is the $i^{th}$ element of the array $V_a$.

In particular, the neural episodic controller 110 determines the p nearest key embeddings in the episodic memory module 204 to the current key embedding h according to a distance measure, e.g., a kernel function. For example, the neural episodic controller 110 can compute distances between the current key embedding h to each of the key embedding $h_i$ in the episodic memory module 204 using the following kernel function:

$$k(h, h_i) = \frac{1}{\|h - h_i\|_2^2 + \delta},$$

where $\delta$ is a predetermined constant, for example, $\delta=10^{-3}$. The neural episodic controller 110 can select p key embeddings in the episodic memory module 204 that have the shortest distances to the current key embedding h according to the kernel function.

After the p nearest key embeddings in the episodic memory module 204 for the action a have been determined, the Q Value Engine 112 is configured to determine a respective weight for each of the p nearest key embeddings from distances between the p nearest key embeddings and the current key embedding h according to the above distance measure. Specifically, the respective weight $w_i$ for each key embedding $h_i$ in the set of p nearest key embeddings can be determined as follows:

$$w_i = \frac{k(h, h_i)}{\sum_j k(h, h_j)}$$

For each key embedding $h_i$ of the p nearest key embeddings, the Q Value Engine is configured to multiply the estimated return $Q_i$ mapped to the key embedding $h_i$ with the weight $w_i$ for the key embedding $h_i$ to obtain a respective weighted estimated return $Y_i = w_i Q_i$.

In some implementations, the Q Value Engine 112 is configured to sum the weighted estimated returns for the action a, and to use the summed weighted estimated return as the Q value for current observation s and action a as follows:

$$Q(s, a) = \sum_i w_i Q_i$$

In some other implementations, the neural episodic controller 110 can process the p nearest embeddings and the estimated returns using a return neural network, e.g., a network that includes one or more fully-connected layers, to generate the Q value.

For example, in some cases, the neural episodic controller 110 processes a network input that includes a sum of weighted estimated returns through the return neural network in accordance with current values of parameters of the return neural network to generate the Q value. In some other cases, the neural episodic controller 110 processes a network input that includes the weighted estimated returns through the return neural network in accordance with current values of parameters of the return neural network to generate the Q value.

Figure 3:
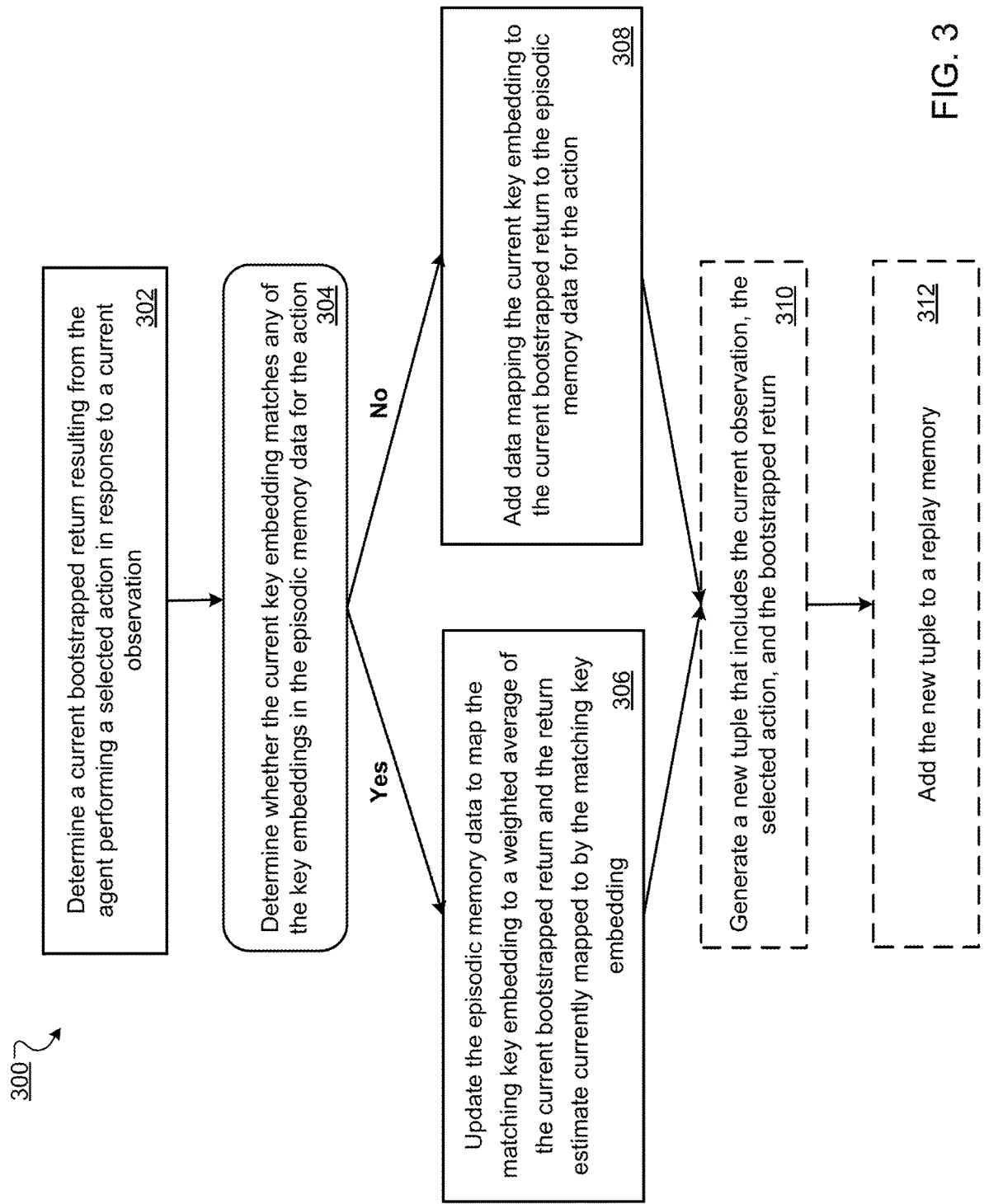
FIG. 3 is a flow diagram of an example process for updating episodic memory data and adding a new tuple to a replay memory.

FIG. 3 is a flow diagram of an example process 300 for updating episodic memory data and adding a new tuple to a replay memory. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system determines a current bootstrapped return resulting from the agent performing a selected action a in response to a current observation $s_t$ at time step t (step 302). The system determines a first term by summing N−1 time-discounted rewards received by the system at N−1 time steps following the current time step i. The system determines a second term, which is a time discounted maximum Q value for observation $s_t$+N at time step t+N. To find the maximum Q value for observation $s_{t+N}$, the system queries all episodic memory modules $M_a$ for each action a, and selects the highest estimated Q value. The system sums the first term and the second term to determine the current bootstrapped return.

In particular, the current bootstrapped return can be computed using the following N-step Q value estimate equation:

$$Q^{(N)}(s_t, a) = \sum_{j=0}^{N-1} \gamma^j r_{t+j} + \gamma^N \max_{a'} Q(s_{t+N}, a').$$

where $\gamma^j$ and $\gamma^N$ are discount rates, a' is the action that yields the highest estimated Q value for observation $s_{t+N}$ at time step t+N. N is a predetermined integer, for example, N can be fifty, one hundred, or two hundred.

The system determines whether the current key embedding matches any of the key embeddings in the episodic memory data (i.e., episodic memory module) for the action (step 304).

When the current key embedding matches a key embedding in the episodic memory data for the action, the system updates the episodic memory data to map the matching key embedding to a weighted average of the current bootstrapped return and the return estimate currently mapped to by the matching key embedding (step 306).

In particular, assuming a current key embedding h matches a key embedding $h_i$, the system updates the episodic memory data to map the matching key embedding $h_i$ to $$Q_i + \alpha(Q^{(N)}(s,a) - Q_i),$$

where $Q^N(s,a)$ is the current bootstrapped return, $Q_i$ is the return estimate currently mapped to by the matching key embedding $h_i$, and α is a learning rate of the Q update. The learning rate α can be changed. For example, in some cases, the learning rate can take on a high value to allow repeatedly visited states with a stable representation to rapidly update their Q value estimate.

When the current key embedding does not match any of the key embeddings in the episodic memory data for the action, the system adds data mapping the current key embedding to the current bootstrapped return to the episodic memory data for the action (step 308).

Optionally, the system may generate a new tuple that includes the current observation, the selected action, and the bootstrapped return (step 310).

The system may then add the new tuple to a replay memory (step 312).

Figure 4:
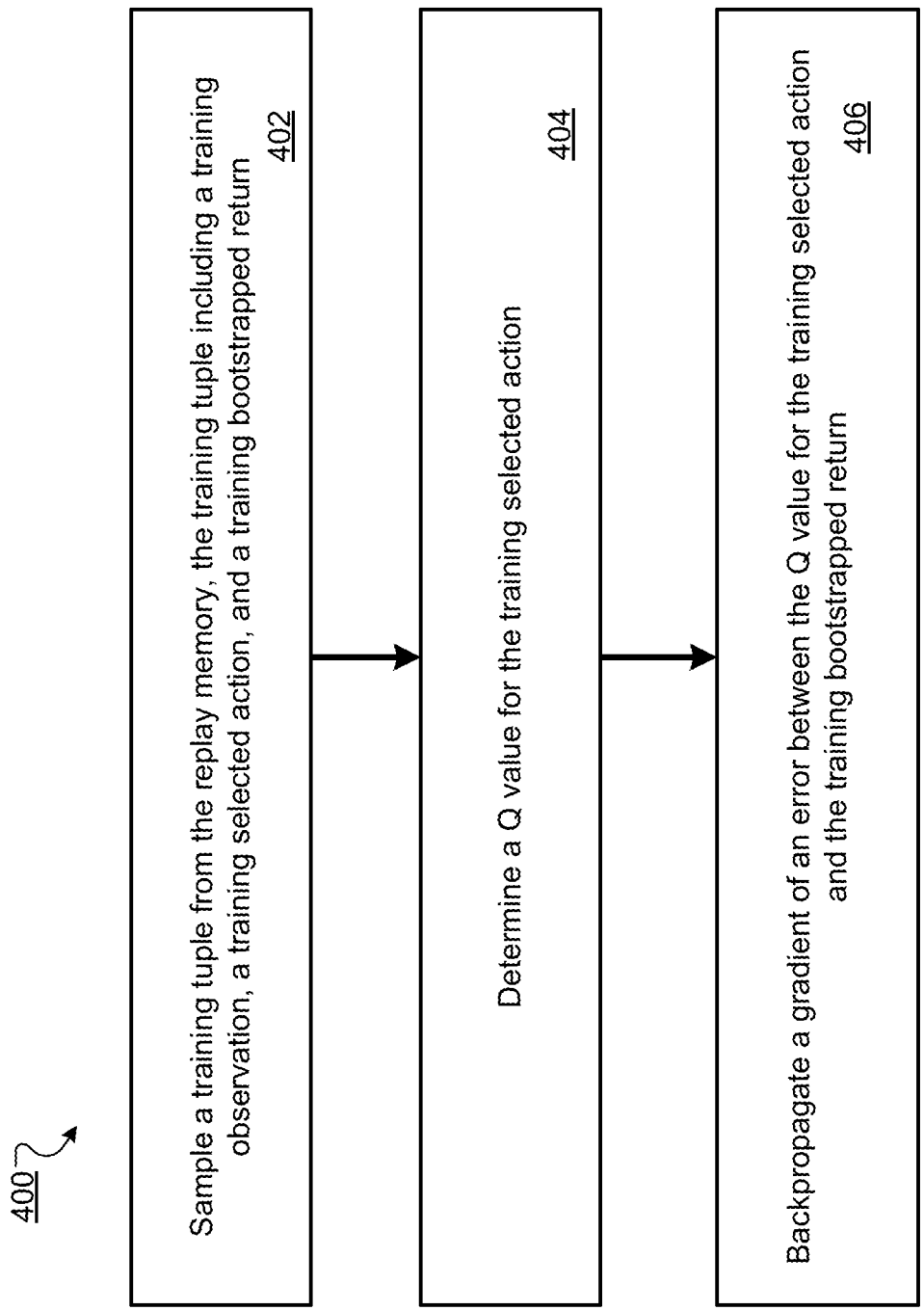
FIG. 4 is a flow diagram of an example process for training the neural episodic controller using a training tuple from the replay memory.

FIG. 4 is a flow diagram of an example process 400 for training the neural episodic controller using a training tuple from the replay memory. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system samples a training tuple from the replay memory (step 402).

In some cases, the system randomly samples mini-batches of training tuples from the replay memory to train the neural episodic controller more effectively.

Each training tuple includes a training observation, a training selected action, and a training bootstrapped return.

For each training tuple, the system determines a Q value for the training selected action from the training observation (step 404). The system determines the Q value for the training selected action by following the process described in detail above with reference to FIG. 2.

The system backpropagates a gradient of an error between the Q value for the training selected action and the training bootstrapped return to (i) update the key embeddings and the estimated returns in the episodic memory data, and (ii) update the current values of the parameters of the embedding neural network (step 406). During training, the system can use a learning rate that is lower than the rate used for updating the episodic memory data after querying the episodic memory data.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training a neural episodic controller that comprises an embedding neural network, the neural episodic controller maintaining episodic memory data that comprises a respective episodic memory module for each action of a plurality of actions that may be performed by an agent in response to an observation, the episodic memory module for each action mapping each of a respective plurality of key embeddings to a respective return estimate, the method comprising:
   sampling, by one or more computers, a training tuple from the replay memory, the training tuple comprising a training observation, a training selected action, and a training return;
   processing the training observation using the embedding neural network in accordance with current values of parameters of the embedding neural network to generate a training key embedding for the training observation;
   identifying, from the episodic memory data, a respective episodic memory module for the training selected action in the training tuple, wherein the respective episodic memory module (i) includes a first array of vectors with each vector representing a respective key embedding and a second array of vectors with each vector representing a respective return estimate and (ii) maps each key embedding in the first array of vectors to a corresponding return estimate in the second array of vectors, wherein the key embeddings represented by the first array of vectors are key embeddings of observations in response to which the training selected action was performed by the agent, and wherein a return estimate mapped to by a key embedding of a given observation is an estimate of a combination of rewards received after the agent performed the training selected action in response to the given observation;
   determining whether the training key embedding associated with the training observation matches any of the key embeddings in the first array of vectors of the episodic memory module for the training selected action;
   when the training key embedding matches a key embedding in the first array of vectors of the episodic memory module for the training selected action, updating the episodic memory module using an episodic memory learning rate, wherein updating the episodic memory module comprises mapping the matching key embedding to a new return estimate that is computed based on (i) the training return, (ii) the return estimate currently mapped to by the matching key embedding, and (iii) the episodic memory learning rate;
   determining, by the one or more computers, a Q value for the training selected action from the training observation, wherein the Q value for the selected action is a predicted return that would result from the agent performing the training selected action in response to the training observation; and
   backpropagating, by the one or more computers, a gradient of an error between the Q value for the training selected action and the training return to update current values of parameters of the embedding neural network using an embedding neural network learning rate that is smaller than the episodic memory learning rate used to update the episodic memory module.

2. The method of claim 1, wherein determining the Q value for the training selected action comprises:
   determining the p nearest key embeddings in the episodic memory module for the training selected action to the training key embedding according to a distance measure, and
   determining the Q value for the training selected action from the return estimates mapped to by the p nearest key embeddings in the episodic memory module for the training selected action.

3. The method of claim 2, wherein determining the Q value for the training selected action from the return estimates mapped to by the p nearest key embeddings in the episodic memory module for the training selected action comprises:
   determining a respective weight for each of the p nearest key embeddings in the episodic memory module for the training selected action from distances between the p nearest key embeddings and the training key embedding according to the distance measure; and
   for each of the p nearest key embeddings in the episodic memory module for the training selected action, weighting the return estimate mapped to the training key embedding by the weight for the training key embedding to determine a respective weighted estimated return.

4. The method of claim 3, wherein determining the Q value for the training selected action comprises:
   summing the weighted return estimates for the training selected action; and
   using the summed weighted return estimate as the Q value.

5. The method of claim 3, wherein determining the Q value for the training selected action comprises:
   summing the weighted return estimates for the training selected action; and
   processing a network input that comprises the summed weighted return estimate through a return neural network in accordance with current values of parameters of the return neural network to generate the Q value.

6. The method of claim 3, wherein determining the Q value for the training selected action comprises:
   processing a network input that comprises the weighted return estimates through a return neural network in accordance with current values of parameters of the return neural network to generate the Q value.

7. The method of claim 1, wherein the embedding neural network is a convolutional neural network.

8. The method of claim 1, wherein the embedding neural network comprises one or more recurrent neural network layers.

9. The method of claim 1, further comprising:
when the training key embedding does not match any of the key embedding in the episodic memory module for the training selected action, adding data mapping the current key embedding to the training return to the episodic memory module for the training selected action.

10. One or more non-transitory computer storage media storing instructions that, when executed by the one or more computers, cause the one or more computers to perform operations for training a neural episodic controller that comprises an embedding neural network, the neural episodic controller maintaining episodic memory data that comprises a respective episodic memory module for each action of a plurality of actions that may be performed by an agent in response to an observation, the episodic memory module for each action mapping each of a respective plurality of key embeddings to a respective return estimate, the operations comprising:
sampling, by one or more computers, a training tuple from the replay memory, the training tuple comprising a training observation, a training selected action, and a training return;
processing the training observation using the embedding neural network in accordance with current values of the parameters of the embedding neural network to generate a training key embedding for the training observation;
identifying, from the episodic memory data, a respective episodic memory module for the training selected action in the training tuple, wherein the respective episodic memory module (i) includes a first array of vectors with each vector representing a respective key embedding and a second array of vectors with each vector representing a respective return estimate and (ii) maps each key embedding in the first array of vectors to a corresponding return estimate in the second array of vectors, wherein the key embeddings represented by the first array of vectors are key embeddings of observations in response to which the training selected action was performed by the agent, and wherein a return estimate mapped to by a key embedding of a given observation is an estimate of a combination of rewards received after the agent performed the training selected action in response to the given observation;
determining whether the training key embedding associated with the training observation matches any of the key embeddings in the first array of vectors of the episodic memory module for the training selected action;
when the training key embedding matches a key embedding in the first array of vectors of the episodic memory module for the training selected action, updating the episodic memory module using an episodic memory learning rate, wherein updating the episodic memory module comprises mapping the matching key embedding to a new return estimate that is computed based on (i) the training return, (ii) the return estimate currently mapped to by the matching key embedding, and (iii) the episodic memory learning rate;
determining, by the one or more computers, a Q value for the training selected action from the training observation, wherein the Q value for the selected action is a predicted return that would result from the agent performing the training selected action in response to the training observation; and
backpropagating, by the one or more computers, a gradient of an error between the Q value for the training selected action and the training return to update current values of parameters of the embedding neural network using an embedding neural network learning rate that is smaller than the episodic memory learning rate used to update the episodic memory module.

11. The one or more non-transitory computer storage media of claim 10, wherein the operations for determining the Q value for the training selected action comprise:
determining the p nearest key embeddings in the episodic memory module for the training selected action to the training key embedding according to a distance measure, and
determining the Q value for the training selected action from the return estimates mapped to by the p nearest key embeddings in the episodic memory module for the training selected action.

12. The one or more non-transitory computer storage media of claim 11, wherein the operations for determining the Q value for the training selected action from the return estimates mapped to by the p nearest key embeddings in the episodic memory module for the training selected action comprise:
determining a respective weight for each of the p nearest key embeddings in the episodic memory module for the training selected action from distances between the p nearest key embeddings and the training key embedding according to the distance measure; and
for each of the p nearest key embeddings in the episodic memory module for the training selected action, weighting the return estimate mapped to the training key embedding by the weight for the training key embedding to determine a respective weighted estimated return.

13. The one or more non-transitory computer storage media of claim 12, wherein the operations for determining the Q value for the training selected action comprise:
summing the weighted return estimates for the training selected action; and
using the summed weighted return estimate as the Q value.

14. The one or more non-transitory computer storage media of claim 12, wherein the operations for determining the Q value for the training selected action comprise:
summing the weighted return estimates for the training selected action; and
processing a network input that comprises the summed weighted return estimate through a return neural network in accordance with current values of parameters of the return neural network to generate the Q value.

15. The one or more non-transitory computer storage media of claim 12, wherein the operations for determining the Q value for the training selected action comprise:
processing a network input that comprises the weighted return estimates through a return neural network in accordance with current values of parameters of the return neural network to generate the Q value.

16. The one or more non-transitory computer storage media of claim 10, wherein the embedding neural network is a convolutional neural network.

17. The one or more non-transitory computer storage media of claim 10, wherein the embedding neural network comprises one or more recurrent neural network layers.

18. The one or more non-transitory computer storage media of claim 10, wherein the operations further comprise:
when the training key embedding does not match any of the key embedding in the episodic memory module for the training selected action, adding data mapping the current key embedding to the training return to the episodic memory module for the training selected action.

19. A system comprising one or more computers and one or more non-transitory computer storage media storing instructions that, when executed by the one or more computers, cause the one or more computers to perform operations for training a neural episodic controller that comprises an embedding neural network, the neural episodic controller maintaining episodic memory data that comprises a respective episodic memory module for each action of a plurality of actions that may be performed by an agent in response to an observation, the episodic memory module for each action mapping each of a respective plurality of key embeddings to a respective return estimate, the operations comprising:
sampling, by the one or more computers, a training tuple from the replay memory, the training tuple comprising a training observation, a training selected action, and a training return;
processing the training observation using the embedding neural network in accordance with current values of the parameters of the embedding neural network to generate a training key embedding for the training observation;
identifying, from the episodic memory data, a respective episodic memory module for the training selected action in the training tuple, wherein the respective episodic memory module (i) includes a first array of vectors with each vector representing a respective key embedding and a second array of vectors with each vector representing a respective return estimate and (ii) maps each key embedding in the first array of vectors to a corresponding return estimate in the second array of vectors, wherein the key embeddings represented by the first array of vectors are key embeddings of observations in response to which the training selected action was performed by the agent, and wherein a return estimate mapped to by a key embedding of a given observation is an estimate of a combination of rewards received after the agent performed the training selected action in response to the given observation;
determining whether the training key embedding associated with the training observation matches any of the key embeddings in the first array of vectors of the episodic memory module for the training selected action;
when the training key embedding matches a key embedding in the first array of vectors of the episodic memory module for the training selected action, updating the episodic memory module using an episodic memory learning rate, wherein updating the episodic memory module comprises mapping the matching key embedding to a new return estimate that is computed based on (i) the training return, (ii) the return estimate currently mapped to by the matching key embedding, and (iii) the episodic memory learning rate;
determining, by the one or more computers, a Q value for the training selected action from the training observation, wherein the Q value for the selected action is a predicted return that would result from the agent performing the training selected action in response to the training observation; and
backpropagating, by the one or more computers, a gradient of an error between the Q value for the training selected action and the training return to update current values of parameters of the embedding neural network using an embedding neural network learning rate that is smaller than the episodic memory learning rate used to update the episodic memory module.

20. The system of claim 19, wherein the operations further comprise:
when the training key embedding does not match any of the key embedding in the episodic memory module for the training selected action, adding data mapping the current key embedding to the training return to the episodic memory module for the training selected action.

* * * * *